United States Patent
Vishwanath et al.

(10) Patent No.: US 10,956,525 B1
(45) Date of Patent: *Mar. 23, 2021

(54) PERSONALIZING CONTENT ASSOCIATED WITH A THIRD PARTY SYSTEM FOR PRESENTATION TO AN ONLINE SYSTEM USER BASED ON INTERACTIONS PERFORMED BY THE USER WITH CONTENT FROM THE THIRD PARTY SYSTEM

(71) Applicant: Facebook, Inc., Menlo Park, CA (US)

(72) Inventors: Tirunelveli R. Vishwanath, Sunnyvale, CA (US); Vijaye Ganesh Raji, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 16/291,274

(22) Filed: Mar. 4, 2019

Related U.S. Application Data

(63) Continuation of application No. 15/960,555, filed on Apr. 24, 2018, now Pat. No. 10,262,069, which is a
(Continued)

(51) Int. Cl.
*G06F 16/00* (2019.01)
*G06F 16/9535* (2019.01)
(Continued)

(52) U.S. Cl.
CPC ........ *G06F 16/9535* (2019.01); *G06F 16/248* (2019.01); *G06F 16/24575* (2019.01);
(Continued)

(58) Field of Classification Search
CPC .......... G06F 16/9535; G06F 16/24575; G06F 16/248; H04L 67/20; H04L 67/22; H04L 67/306
See application file for complete search history.

(56) References Cited

U.S. PATENT DOCUMENTS

| | | | |
|---|---|---|---|
| 2006/0123340 A1* | 6/2006 | Bailey | G06F 9/44526 715/700 |
| 2009/0070412 A1* | 3/2009 | D'Angelo | H04L 67/306 709/203 |

(Continued)

*Primary Examiner* — Jared M Bibbee
(74) *Attorney, Agent, or Firm* — Fenwick & West LLP

(57) ABSTRACT

An online system stores information identifying interactions by online system users with content provided by a third party system. The third party system includes a tracking mechanism in content that specifies one or more interactions with the content. When a user performs a specified interaction with the content via a client device, the tracking mechanism communicates information describing the performed interaction from the client device to the online system. The online system retrieves information identifying the user from the client device and stores the information describing the performed interaction in association with the information identifying the user. The third party system requests the online system generate content for presentation to the user, and the online system identifies content provided by the third party system with which additional users having at least a threshold measure of similarity to the user interacted to present to the user.

19 Claims, 3 Drawing Sheets

Related U.S. Application Data continuation of application No. 14/678,626, filed on Apr. 3, 2015, now Pat. No. 9,977,834.

(51) Int. Cl.
  *G06F 16/2457* (2019.01)
  *H04L 29/08* (2006.01)
  *G06F 16/248* (2019.01)
(52) U.S. Cl.
  CPC .............. *H04L 67/20* (2013.01); *H04L 67/22* (2013.01); *H04L 67/306* (2013.01)

(56) References Cited

U.S. PATENT DOCUMENTS

| | | | | |
|---|---|---|---|---|
| 2009/0259552 A1* | 10/2009 | Chenard | ............ | G06Q 30/0277 705/14.72 |
| 2011/0087678 A1* | 4/2011 | Frieden | ................ | G06F 16/954 707/749 |
| 2011/0138171 A1* | 6/2011 | Yildiz | .................. | H04L 67/306 713/153 |
| 2012/0030037 A1* | 2/2012 | Carriero | ............. | G06Q 30/0277 705/14.73 |
| 2012/0079019 A1* | 3/2012 | Miettinen | ............. | H04L 67/303 709/204 |
| 2012/0117581 A1* | 5/2012 | Curtis | .................. | G06F 3/0484 725/9 |
| 2012/0158513 A1* | 6/2012 | Schoen | ............. | G06Q 30/0276 705/14.66 |
| 2012/0166520 A1* | 6/2012 | Lindsay | ................ | G06F 3/0488 709/203 |
| 2013/0036016 A1* | 2/2013 | Pattan | .................... | H04L 67/20 705/14.73 |
| 2013/0073389 A1* | 3/2013 | Heath | .................... | G06Q 50/01 705/14.54 |
| 2013/0080526 A1* | 3/2013 | Gill | ........................ | G06Q 10/10 709/204 |
| 2013/0085859 A1* | 4/2013 | Sim | ........................ | G06Q 30/02 705/14.58 |
| 2013/0138585 A1* | 5/2013 | Forte | .................... | G06F 16/955 706/12 |
| 2013/0232159 A1* | 9/2013 | Daya | .................... | G06F 16/337 707/758 |
| 2014/0040729 A1* | 2/2014 | Marlow | ................ | G06F 16/972 715/240 |
| 2014/0114761 A1* | 4/2014 | Lee | .................... | G06Q 30/0241 705/14.54 |
| 2014/0122472 A1* | 5/2014 | Wells | .................... | G06Q 30/0204 707/732 |
| 2014/0237236 A1* | 8/2014 | Kalinichenko | ......... | G06F 21/43 713/168 |
| 2014/0280915 A1* | 9/2014 | Nemer | .................... | G06Q 50/01 709/224 |
| 2015/0012535 A1* | 1/2015 | Tiu, Jr. | .................. | G06F 16/954 707/736 |
| 2015/0112918 A1* | 4/2015 | Zheng | .................... | G06Q 30/02 706/48 |
| 2015/0178282 A1* | 6/2015 | Gorur | ................ | G06F 16/9535 707/748 |
| 2016/0259797 A1* | 9/2016 | Lewis | ............... | G06F 16/24578 |

\* cited by examiner

PERSONALIZING CONTENT ASSOCIATED WITH A THIRD PARTY SYSTEM FOR PRESENTATION TO AN ONLINE SYSTEM USER BASED ON INTERACTIONS PERFORMED BY THE USER WITH CONTENT FROM THE THIRD PARTY SYSTEM

CROSS REFERENCE TO RELATED APPLICATIONS

This application is a continuation of co-pending U.S. application Ser. No. 15/960,555, filed Apr. 24, 2018, which is a continuation of U.S. application Ser. No. 14/678,626, filed Apr. 3, 2015, now U.S. Pat. No. 9,977,834, which are incorporated by reference in their entirety.

BACKGROUND

This disclosure relates generally to online systems, and more specifically to selecting content for presentation to users of an online system.

An online system, such as a social networking system, allows users to connect to and to communicate with other users of the online system. Users create profiles on an online system that are tied to their identities and include information about the users, such as interests and demographic information. The users may be individuals or entities such as corporations or charities. Content items are presented to various users by the online system to encourage users to interact with the online system.

The increasing popularity of online systems, such as social networking system, allows entities (e.g., businesses) to gain public attention for products or services or to persuade online system users to take actions regarding products or services provided by the entities via an online system. For example, an entity (e.g., a business) presents content items to online system users to gain public attention for products or services or to persuade online system users to take an action regarding products or services provided by the entity. Many online systems may receive compensation from an entity for presenting certain types of content items provided by the entity to online system users.

To allow an entity to particularly tailor content presented by the online system to specific online system users, the entity associates targeting criteria with content identifying characteristics of online system users eligible to be presented with the content. For example, if an entity associates content with targeting criteria identifying one or more characteristics of users eligible to be presented with the content, the online system identifies users of the online system having at least a threshold number of the one or more characteristics identified by the targeting criteria as eligible to be presented with the content and does not present the content to users that do not have at least the threshold number of the one or more criteria specified by the targeting criteria. User characteristics specified by targeting criteria may be demographic information, connections between users and other users, actions performed by the user, interests of the user, or any other suitable information maintained by the online system.

Conventionally, actions specified by targeting criteria associated with content are limited to actions performed by users through the online system or actions that are communicated to the online system for logging by third party systems. For example, a conventional online system stores interactions between its users and content presented by the online system. However, online system users interact with content and perform other actions through third party systems external to the online system that are not captured by the online system, limiting the information about online system users usable by the online system to select content for presentation to its users.

SUMMARY

An online system receives information describing interactions by users of the online system with content provided by a third party system from client devices associated with the users. The content provided by the third party system includes a tracking mechanism including instructions that are executed by a client device presenting the content when a user performs one or more interactions with the content provided by the third party system. When the instructions in the tracking mechanism are executed, information identifying the one or more interactions is communicated from the client device to the online system. In various embodiments, the third party system specifies one or more interactions in the tracking mechanism so the tracking mechanism communicates information identifying the user when the specified interactions with the content provided by the third party system are performed. Example interactions specified by the third party system in the tracking mechanism include adding a product to an online shopping cart maintained by the third party system, viewing content (e.g., a web page, a product, etc.), provided by the third party system, viewing content provided by the third party system for at least a specified amount of time (e.g., viewing video data provided by the third party system for at least the specified amount of time), adding a product to a list of products associated with the user by the third party system, requesting information from the third party system, subscribing to a service provided by the third party system, storing content to the third party system, indicating a preference for content provided by the third party system, sharing content provided by the third party system with another user, or providing a comment associated with content provided by the third party system.

When the user performs an interaction specified by the tracking mechanism with content provided by the third part system via a client device, the client device executes instructions in the tracking mechanism that communicate information describing the interaction to the online system. Information communicated to the online system identifies the interaction and identifies content provided by the third party system involved in the interaction (e.g., a product, a content item, a service, etc.). For example, executing instructions in the tracking mechanism creates a frame in the content provided by the third party system, where the frame is associated with the online system (e.g., the frame is in a domain of the online system) and communicates the information describing the interaction to the online system.

As another example, the content (e.g., an application provided by the third party system that a user uses to access content provided by the third party system) includes an application programming interface call or other mechanism included in the content by the third party system that identifies the action and content provided by the third party system involved in the interaction. In some embodiments, the application programming interface call is included in a software development kit or other set of instructions provided to the third party system by the online system. When the user performs the interaction specified by the application programming interface call with the content provided by the third party system via the client device, the client device executes the application programming interface call and communicates information describing the interaction to the online system. In some embodiments, the application programming interface call also obtains user identifying information from an application executing on the client device associated with the online system and communicates the user identifying information to the online system along with information describing the interaction. For example, the application programing interface call retrieves obfuscated (e.g., a hashed) user identifying information associated with the user by the online system and stored on the client device. Hence, the third party system may include the application programming interface or other suitable tracking mechanism in an application provided by the third party system to communicate interactions by the user with the application to the online system.

The online system retrieves information identifying the user who performed the interaction described by the information received from the tracking mechanism. To maintain the user's privacy from the third party system, the online system retrieves user identifying information associated with the user by the online system and stored on the client device on which the interaction was performed. For example, the online system retrieves user identifying information from a cookie previously communicated by the online system to an application (e.g. a browser) executing on the client device used to perform the interaction. As another example, the online system retrieved user identifying information from obfuscated information identifying the user to the online system included in the information describing the interaction with the content provided by the third party system.

The online system stores the information describing the interaction with the content provided by the third party system received from the tracking mechanism in association with the user identifying information for the user who performed the interaction. For example, the online system identifies a user profile associated with the user identifying information and stores the information describing the interaction with the content provided by the third party system in association with the user profile. As various users interact with content provided by the third party system, the online system stores information associated with the users identifying their interactions with content provided by the third party system received via tracking mechanisms included in the content. Communicating information describing users' interactions with content provided by the third party system to the online system allows interactions between the users and the content to be stored without providing information identifying the users to the third party system.

In various embodiments, the information stored by the online system describing the user's interactions with content provided by the third party system may subsequently be used to identify content for presentation to the user. The third party system may leverage the information maintained by the online system identifying user interactions with content provided by the third party system by providing the online system with a content item associated with targeting criteria identifying interactions with content provided by the third party system. For example, the third party system provides an advertisement request ("ad request") to the third party system including content for presentation to online system users and including targeting criteria specifying one or more interactions with content provided by the third party system or specifying an interaction with specific content provided by the third party system. Based on the stored information identifying interactions by users with content provided by the third party system, the online system identifies one or more users satisfying the targeting criteria associated with the content from the third party system and includes the content from the third party system in one or more selection processes that identify content for presentation to the identified users. For example, if a content item form the third party system is associated with targeting criteria specifying inclusion of a product in a list of products maintained by the third party system, the online system identifies users associated with information indicating the users included the product in a list of products associated with the user by the third party system and includes the content item in selection processes performed by the online system to identify content for presentation to various identified users.

Additionally, the online system may analyze information stored by the online system describing user interaction with content provided by the third party system and provide information to the third party system describing user interaction with content provided by the third party system, allowing the third party system to analyze interactions with various content provided by the third party system. For example, the online system may identify various interactions by users with specific content provided by the third party system (e.g., different interactions with a particular web page, a number of various different interactions with a particular web page during a certain time interval). In some embodiments, the online system accounts for characteristics of users when analyzing the information describing user interaction with content provided by the third party system. For example, the online system identifies interactions with content provided by the third party system performed by users having specific characteristics or combinations of characteristics (e.g., users in a specified location, users within a specified age range, etc.). As another example, the online system identifies a number or a frequency of occurrence of a specific interaction with content provided by the third party system. In some embodiments, the third party system provides the online system with criteria specifying one or more of: interactions, content provided by the third party system, and characteristics of the user and the online system identifies interactions by online system users with content satisfying at least a threshold number of the criteria and communicates information describing the identified interactions to the third party system, allowing the online system to provide the third party system with analytical information describing user interactions with content provided by the third party system without providing information identifying online system users to the third party system.

In addition to presenting content from the third party system to online system users based on interactions by the online system users with content provided by the third party system, the online system may generate content for presentation to an online system user based on the stored interactions by the online system user, and other online system users, with content provided by the third party system. For example, the third party system communicates a request to the online system to generate a page of content to a user of the online system. The request includes information identifying the user of the online system, such as a username associated with the user by the online system, an e-mail address associated with the user, a username associated with the user by the third party system, or any other suitable information for the online system to identify the user. After receiving the request, the online system retrieves information associated with the user that is stored by the online system. For example, the online system retrieves prior interactions between the user and content provided by the third party system and demographic information of the user (e.g., age, gender, location, interests, etc.).

Based on the information stored by the online system and associated with the user, the online system determines measures of similarity between the user and additional users of the online system. For example, the measure of similarity between the user and an additional user is a cosine similarity between demographic information associated with the user and demographic information associated with the additional user. The online system may determine the cosine similarity based on a set of demographic information associated with the user and with the additional user; in some embodiments, the request from the online system identifies the set of demographic information, allowing the third party system to specify the demographic information used for determining the measures of similarity. The online system selects one or more of the additional users based at least in part on the determined measures of similarity. For example, the online system selects additional users having at least a threshold measure of similarity and identifies content provided by the third party system with which the selected additional users interacted based on information stored by the online system describing interactions by the selected additional users with content provided by the third party system. Alternatively, the online system ranks additional users based on their measures of similarity to the user and selects additional users having at least a threshold position in the ranking and identifies content provided by the third party system with which the selected additional users interacted. In various embodiments, the online system identifies content provided by the third party system with which at least a threshold number or threshold percentage of the selected additional users interacted. For example, the online system identifies content item identifiers or product identifiers used by the third party system to identify content presented to the selected additional users.

Based on the identified content provided by the third party system with which the selected additional users interacted, the online system generates a page of content for presentation to the user. In some embodiments, the online system generates instructions for presenting various portions of the identified content item to the user in a page or other suitable format. For example, the page includes identified content items or products presented to the selected additional users by the third party system with which the selected additional users interacted. The online system may group the identified content items or products with which the selected additional users interacted based on the types of interactions by the selected additional users with the identified content items or products. For example, the page generated by the online system includes a group of identified products that the selected additional users included in an online shopping cart and another group of identified products that the selected additional users included in lists associated with the selected additional users by the third party system. In some embodiments, the online system orders identified content items or products based on characteristics of the identified content items or products and/or characteristics of the selected additional users. For example, identified content items or products with which selected additional users having greater than a threshold measure of similarity to the user are more prominently presented in the generated page. As another example, identified content items or products with which at least a threshold number of selected additional users interacted or performed a specific type of interaction are more prominently presented in the generated page. The online system may communicate the generated page to the third party system for presentation to the user or may present the generated page itself in various embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
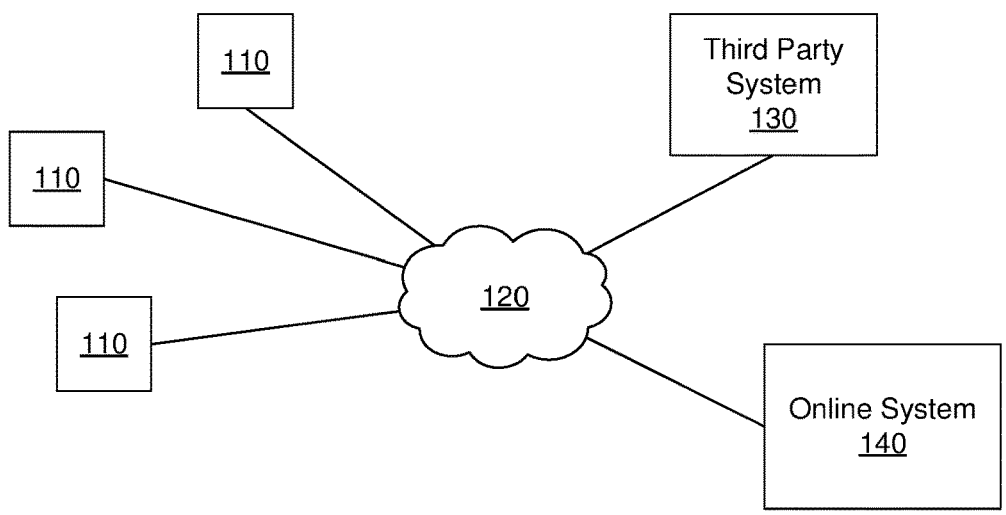
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

In some embodiments, a third party system 130 includes a tracking mechanism (e.g., a tracking pixel) into content provided by the third party system 130, such as web pages. The tracking mechanism is code included in content provided by the third party system 130 that, when executed by a client device 110 presenting the content, communicates a request for content from the client device 110 to the online system 140 that includes information identifying the user to the online system 140 retrieved from the client device 110 and information describing the content from the third party system 130 that is presented. In some embodiments, different tracking mechanisms are included in different content provided by a third party system 130, such as different web pages provided by the third party system 130. For example, a third party system 130 includes different tracking pixels on different web pages provided by the third party system 130. Alternatively, a common tracking pixel is included in different web pages provided by the third party system 130. For example, a third party system 130 provides various websites that are each associated with a different tracking pixel where multiple web pages associated with a website include the tracking pixel associated with the website. A tracking mechanism included in content provided by a third party system may communicate any suitable information to the online system 140 when executed by the client device 110. Examples of information communicated by a tracking mechanism include information identifying the third party system 130 (e.g., an advertiser), information identifying the content from the third party system 130 presented, a date and time when the content from the third party system 130 was accessed, information associated with a user of the client device 110 presenting the content from the third party system 130 by the online system 140, etc.

In other embodiments, the tracking mechanism is included in an application operating on the client device 110, such as an application provided by the third party system 130. When the client device executes instructions included in the tracking mechanism, the client device 110 communicates information describing interactions by a user of the online system 140 with the application (or with a third party system 130) to the online system 140, which logs information describing user interactions with the application and/or the third party system 130 (e.g., a number of times a user of the online system 140 accessed an application, the amount of time the user spent using the application, etc.). In this example, the tracking mechanism is an application program interface (API) call or other mechanism that is invoked by the application during execution; in some embodiments, the online system 140 provides the API call to a third party system 130 providing the application via a software development kit (SDK).

Figure 2:
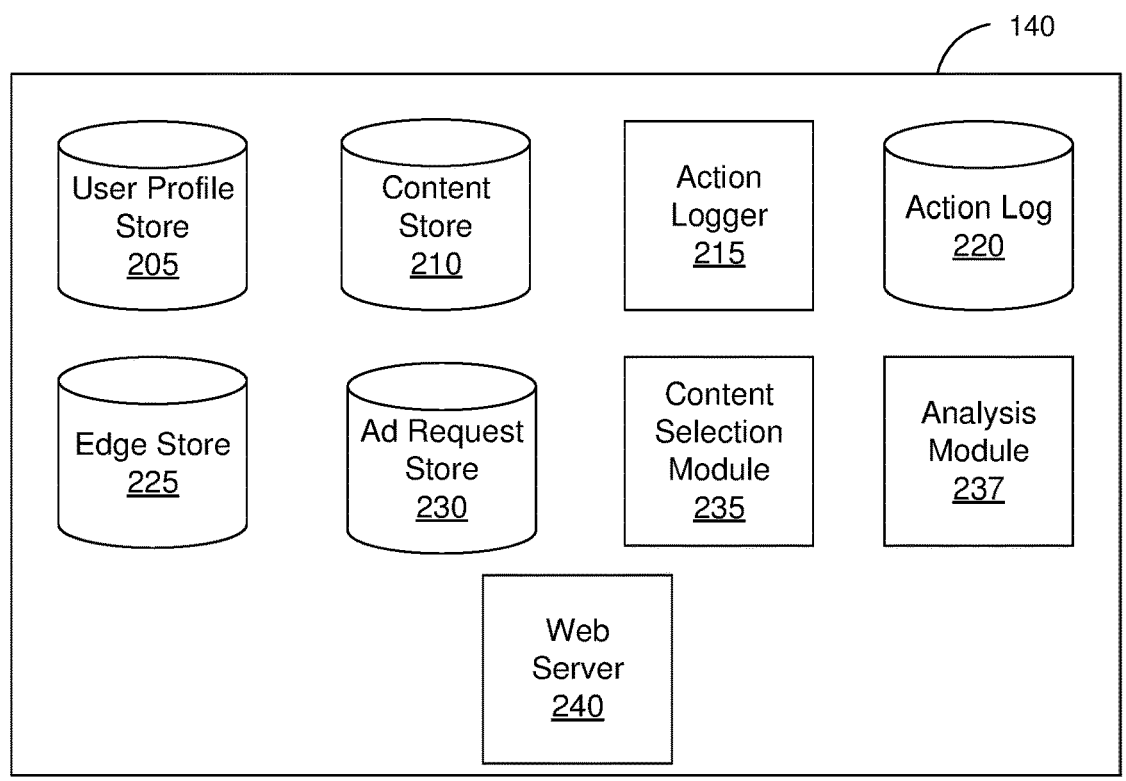
FIG. 2 is a block diagram of an online system, in accordance with an embodiment.

FIG. 2 is a block diagram of an architecture of the online system 140. For example, the online system 140 is a social networking system. The online system 140 shown in FIG. 2 includes a user profile store 205, a content store 210, an action logger 215, an action log 220, an edge store 225, an ad request store 230, a content selection module 235, an analysis module 237, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. As an example, content provided by a third party system 130 to users of the online system may be identified along with information identifying an online system user 140 by information received by the online system 140, and the action logger 215 logs information identifying the content provided by the third party system 130 in the action log 220 in association with the identified user of the online system 140. For example, the action logger 215 logs information describing a number of times a user of the online system 140 accessed a web page provided by a third party system 130 as well as times the user accessed the content based on information communicated to the online system 140 by a tracking pixel, or other tracking mechanism, included in the content. As another example, the action logger 215 logs information describing interactions between a user of the online system 140 and an application (e.g., an application provided by the third party system 130) based on information communicated to the online system 140 by a tracking mechanism, such an application programming interface call, included in the application. For example, the tracking mechanism included in an application identifies a length of time with which the user interacted with the application or identifies one or more interactions with the application, as further described below in conjunction with FIG. 3. Additionally, the action logger 215 logs information interactions between online system users and advertisements presented to the online system users. For example, information describing a number of times a user of the online system 140 clicked on an advertisement or completed a purchase through interacting with an advertisement is logged by the action logger 215 in association with information identifying the user; times associated with the interactions may also be stored in association with information identifying the user and identifying the advertisement. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items (including advertisements), and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Similarly, a third party system 130 may include a tracking mechanism in content provided by the third party system 130. When instructions included in the tracking pixel are executed by a client device 110, the client device 110 communicates information describing one or more interactions with content provided by the third party system 130 by a user to the online system 140. The online system 140 retrieves user identifying information associated with the user by the online system 140 and stored on the client device 110 and stores the information describing the user's interactions with the content provided by the third party system 130 in association with the user in the action log 220. For example, the third party system 130 includes instructions in content that, when executed by a client device 110 presenting the content, identify an interaction with the content matching an interaction specified by the instructions and generate a frame associated with the online system 140 within the content; information describing the identified interaction is then communicated from the client device 110 to the online system 140 via the frame associated with the online system 140. The online system 140 retrieves information stored on the client device 110 by the online system 140 identifying the user via the frame (e.g., a cookie stored on the client device 110), and stores the information describing the identified interaction in association with the user in the action log 220, as further described below in conjunction with FIG. 3. In another embodiment, the information communicated to the online system 140 from the client device 110 describing the identified interaction includes information identifying the user (e.g., a hash of information stored on the client device 110 by the online system 140 that identifies the user to the online system 140), and the online system 140 retrieves information identifying the user from the information communicated to the online system 140. Hence, the action log 220 may record information about actions users perform on a third party system 130, including webpage viewing histories, interactions with advertisements, purchases made, and other patterns from shopping and buying.

In some embodiments, the action log 220 maintains a table or a graph including information identifying interactions with content provided by third party systems 130 associated with a user. For example, the action log 220 includes a table associated with a third party system 130 and a user identifying various content provided by the third party system 130 and interactions with different content provided by the third party system 130 performed by the user. In one embodiment, the table includes columns each associated with a content item identifier or product identifier associated with content provided by the third party system 130 and rows each associated with an interaction. Hence, in the preceding example, an intersection of a row or column indicates whether the user performed an interaction corresponding to the row with the content item or product identifier corresponding to the column or indicates a number of times the user performed the interaction corresponding to the row with the content item or product corresponding to the column. The action log 220 may include different tables associated with a user, with each table associated with a different third party system 130. However, the action log 220 may include any suitable information identifying content provided by one or more third party systems 130 and received information describing interactions by online system users with the content provided by the one or more third party systems 130. Information stored in the action log 220 describing content provided by a third party system 130 and interactions by users with the content provided by the third party system 130 may be limited to a specified time period (e.g., v interactions during the last month) in some embodiments. Storing information describing user interactions with content provided by third party systems 130 is further described below in conjunction with FIG. 3.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content and a bid amount. The advertisement content, also referred to as an "advertisement" or as "ad content," is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the online system 140 if advertisement content in the ad request is presented to a user, if the advertisement content in the ad request receives a user interaction when presented, or if any suitable condition is satisfied when advertisement content in the ad request is presented to a user. For example, the bid amount specifies a monetary amount that the online system 140 receives from the advertiser if advertisement content in an ad request is displayed. In some embodiments, the expected value to the online system of presenting the advertisement content may be determined by multiplying the bid amount by a probability of the advertisement content being accessed by a user.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, the targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an advertisement request. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the viewing user. For example, the content selection module 235 determines measures of relevance of various content items to the user based on characteristics associated with the user by the online system 140 and based on the user's affinity for different content items. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include ad requests or other content items associated with bid amounts. The content selection module 235 uses the bid amounts associated with ad requests when selecting content for presentation to the viewing user. In various embodiments, the content selection module 235 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the online system 140 for presenting an ad request or a content item. For example, the expected value associated with an ad request is a product of the ad request's bid amount and a likelihood of the user interacting with the ad content from the ad request. The content selection module 235 may rank ad requests based on their associated bid amounts and select ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

When selecting content items for presentation to a user, the content selection module 235 identifies content items eligible for presentation to the user based on targeting criteria associated with targeting criteria and characteristics of the user (e.g., demographic information associated with the user, interactions or actions associated with the user, connections between the user and additional users, etc.). Content items associated with at least a threshold number of targeting criteria satisfied by characteristics of the user are identified as eligible for presentation to the user and included in a selection process that selects content for presentation to the user, as further described above. For example, a third party system 130 provides a content item (e.g., an ad request) including targeting criteria specifying a specific interaction with content provided by the third party system 130. The targeting criteria included in the content item may specify an particular interaction with content provided by the third party system 130, specify an interaction with particular content provided by the third party system 130, a particular interaction with content provided by the third party system 130 occurring within a specified time interval, an interaction with particular content provided by the third party system 130 within a specified time interval, or any suitable combination of the preceding. The content selection module 235 retrieves information associated with a user describing interactions by the user with content provided by the third party system 130 and determines the user is eligible to be presented with the content item from the third party system 130 if one or more interactions by the user with content provided by the third party system 130 match the interaction with content provided by the third party system 130 specified by the targeting criteria. If the user is eligible to be presented with the content item, the content selection module 235 includes the content item in a selection process that selects content for presentation to the user. However, if no interactions by the user with content provided by the third party system 130 match the interaction with content provided by the third party system 130 specified by the targeting criteria included in the content item, the content selection module 235 determines the user is ineligible to be presented with the content item and does not include the content item in a selection process that selects content for presentation to the user.

For example, the content selection module 235 receives a request to present a feed of content to a user of the online system 140. The feed may include one or more advertisements from ad request as well as content items, such as stories describing actions associated with other online system users connected to the user. The content selection module 235 accesses one or more of the user profile store 205, the content store 210, the action log 220, and the edge store 225 to retrieve information about the user. For example, stories or other data associated with users connected to the identified user are retrieved. Additionally, one or more advertisement requests ("ad requests") may be retrieved from the ad request store 230 The retrieved stories, ad requests, or other content items, are analyzed by the content selection module 235 to identify candidate content that is likely to be relevant to the identified user. For example, stories associated with users not connected to the identified user or stories associated with users for which the identified user has less than a threshold affinity are discarded as candidate content. Based on various criteria, the content selection module 235 selects one or more of the content items or ad requests identified as candidate content for presentation to the identified user. The selected content items or ad requests are included in a feed of content that is presented to the user. For example, the feed of content includes at least a threshold number of content items describing actions associated with users connected to the user via the online system 140.

In some embodiments, the content selection module 235 generates content for presentation to a user based on interactions by one or more online system users with content presented by a third party system 130. For example, the content selection module 235 receives a request from a third party system 130 to generate a page of content to a user of the online system 140. The request includes information identifying the user of the online system 140, such as a username associated with the user by the online system 140, an e-mail address associated with the user, or any other suitable information for the online system to identify the user. After receiving the request, the content selection module 235 retrieves information from the action log 220 describing prior interactions between the user and content provided by the third party system 130 as well as demographic information of the user (e.g., age, gender, location, interests, etc.) from the user profile store 210.

Based on information associated with the user by the online system 140, the content selection module 235 determines measures of similarity between the user and additional users of the online system 140. For example, the measure of similarity between the user and an additional user is a cosine similarity between demographic information associated with the user and demographic information associated with the additional user. The content selection module 235 selects one or more of the additional users based at least in part on the determined measures of similarity, as further described below in conjunction with FIG. 4. Based on the identified content provided by the third party system 130 with which the selected additional users interacted, the content selection module 235 generates a page of content for presentation to the user. For example, the page includes identified content items or products presented to the selected additional users by the third party system 130 with which the selected additional users interacted. Alternatively, the content selection module 235 retrieves interactions between the user and additional content provided by the third party system 130, the content selection module generates a page of content for presentation to the user. For example, the generated page includes content items or products provided by the third party system 130 with which the user interacted within a threshold amount of time or content items or products provided by the third party system 130 that have greater than a threshold number of characteristics matching a content item or product provided by the third party system 130 with which the user performed a most recent interaction (or performed a most recent specific interaction). Generation of a page or other content based on online system users' interactions with content provided by the third party system 130 is further described below in conjunction with FIG. 4. In various embodiments, the content generation module 235 communicates the generated page to a client device 110 for presentation to the user or communicates the generated page to the third party system 130 for presentation to the user.

The analysis module 237 analyzes information stored by the online system 140 describing interactions by online system users with content provided by one or more third party systems 130. For example, the analysis module 237 analyzes information describing user interactions with content provided a third party system to determine a length of time the users interacted with an application provided by the third party system 130, purchases made by the users via the application provided by the third party system, identifiers of content provided by the third party system 130 that the user viewed, identifiers of content provided by the third party system 130 with which the user performed one or more specified interactions, or other information describing interactions performed by the users or content provided by the third party system 130 with which users performed various interactions. Additionally, the analysis module 237 may identify characteristics of users who performed one or more interactions or who interacted with specific content provided by the third party system 130 from information associated with the users by the online system 140 (e.g., age, gender, location, some other demographic information of users who interacted with specific content provided by the online system 140 or of users who performed one or more particular interactions with content provided by the online system 140). Information from the analysis module 237 may be communicated to a third party system 130, allowing the third party system 130 to modify additional content provided by the third party system 130. The information communicated to the third party system 130 from the analysis module 237 does not include information identifying individual users of the online system 140. For example, the analyzed information may indicate that the majority of online system users who purchased a specific item via an application are female, that the application is generally accessed by online system users in the evening, and that online system users between the ages of 20 and 30 spend greater than a threshold amount of time interacting with the application. The third party system 130 may provide information to the analysis module 237 identifying criteria for analyzing the information describing interactions by users with content provided by the third party system 130 (e.g., specific interactions, specific content provided by the third party system, specific characteristics of users who interacted with content provided by the third party system 130).

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, analyzed information, instant messages, queued messages (e.g., email), text messages, short message service (SMS) messages, or messages sent using any other suitable messaging technique. A user may send a request to the web server 240 to upload information (e.g., images or videos) that is stored in the content store 210. Additionally, the web server 240 may provide application programming interface (API) functionality to send data directly to native client device operating systems, such as IOS®, ANDROID™, WEBOS®, or BlackberryOS.

Figure 3:
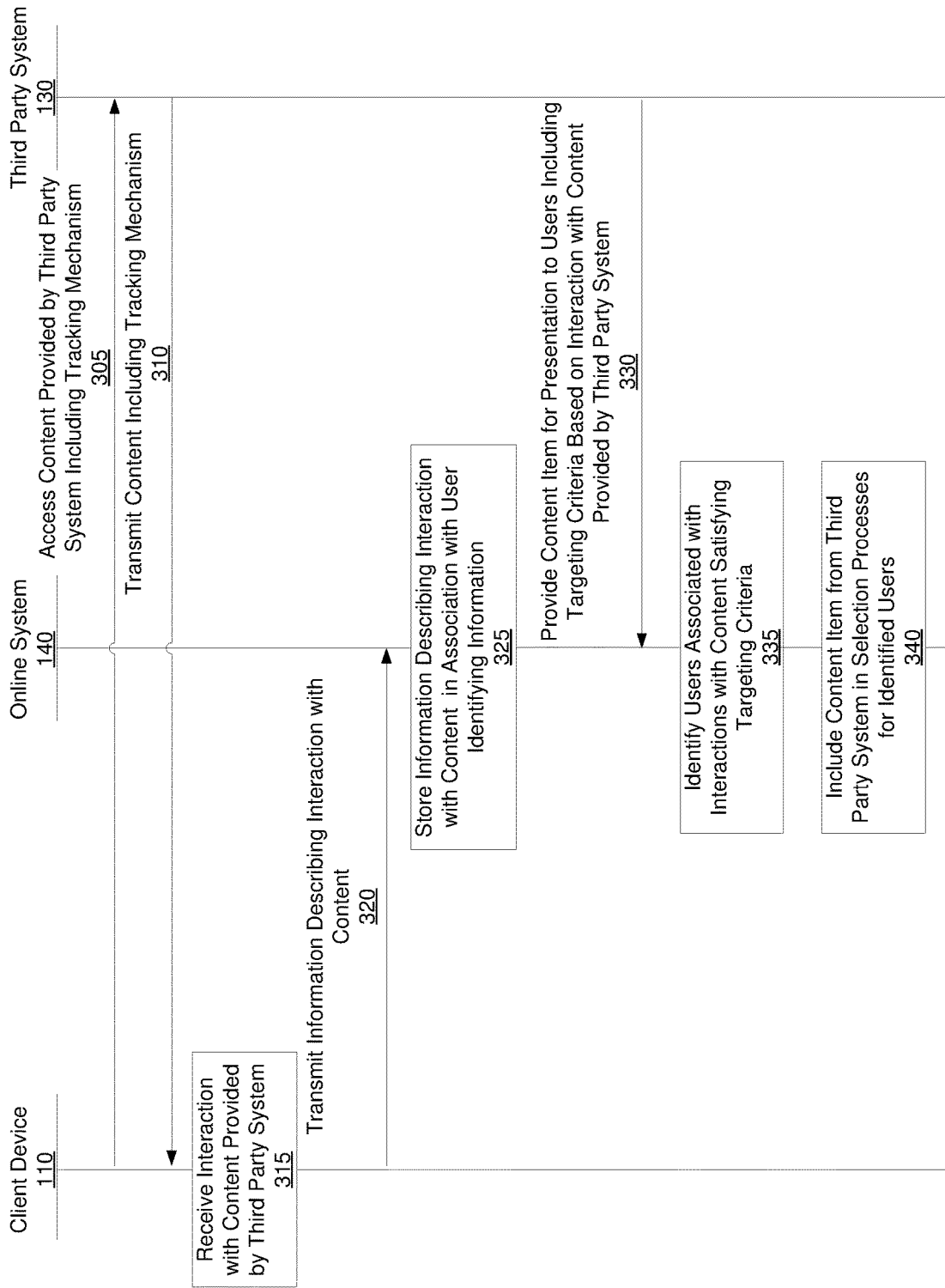
FIG. 3 is an interaction diagram of a method for logging information describing interactions by online system users with content provided by a third party system in accordance with an embodiment.

Storing Interactions by Online System Users with Content Presented by Third Party Systems FIG. 3 is an interaction diagram of one embodiment of a method for logging information describing interactions by online system users with content provided by a third party system 130. In other embodiments, the method may include different and/or additional steps than those shown in FIG. 3. Additionally, steps of the method may be performed in different orders than the order described in conjunction with FIG. 3 in various embodiments.

A user of the online system 140 accesses 305 content provided by a third party system 130 via a client device 110. The third party system 130 transmits 310 the content, which includes a tracking mechanism, to the client device 110 via a network 120 for presentation to the user. For example, the user requests a web page provided by the third party system 130 that includes a tracking mechanism, and the third party system 130 transmits 310 the web page including the tracking pixel or other tracking mechanism to the client device 110 for presentation to the user. In another example, the user uses an application provided by the third party system 130 to access the content provided by the third party system 130 (or content provided by the application). The application includes a tracking mechanism (e.g., an application programming interface call included in the application from a software development kit provided to the third party system 130 by the online system 140). The tracking mechanism identifies one or more interactions with the content provided by the third party system 130 and includes instructions that are executed by the client device 110 when a user performs one or more of the identified interactions with the content provided by the third party system 130. Example interactions specified by the third party system 130 in the tracking mechanism include adding a product to an online shopping cart maintained by the third party system 130, viewing content (e.g., a web page, a product, etc.), provided by the third party system 130, viewing content provided by the third party system 130 for at least a specified amount of time (e.g., viewing video data provided by the third party system 130 for at least the specified amount of time), adding a product to a list of products associated with the user by the third party system 130, requesting information from the third party system 130, subscribing to a service provided by the third party system 130, storing content to the third party system 130, storing content provided by the third party system 130 to the client device 110, indicating a preference for content provided by the third party system 130, sharing content provided by the third party system 130 with another user, or providing a comment associated with content provided by the third party system 130. However, in various embodiments, the third party system 130 identifies any suitable interaction in the tracking mechanism, so the instructions in the tracking mechanism may be executed when the user performs any suitable interaction with the content from the third party system 130 that is identified by the tracking mechanism.

As another example, the tracking mechanism included in the content provided by the third party system 130 is an application programming interface call or other mechanism included in an application that is used by the user to access the third party system 130. In some embodiments, the application programming interface call is included in a software development kit or other set of instructions provided to the third party system 130 by the online system 140. For example, the content provided by the third party system 130 is an application that receives one or more interactions with the application matching applications identified by the application programming interface call and performs the application programming interface call to communicate information describing the one or more received interactions matching the identified interactions to the online system 140. When the user performs an interaction with the content matching an interaction identified by the tracking mechanism, the client device 110 execute the tracking mechanism (e.g., the application programming interface call) and communicates the information describing the interaction with the content to the online system 140.

In some embodiments, the third party system 130 includes different tracking mechanisms in different content provided by the third party system 130; for example, tracking mechanisms included in different content communicate information when different interactions are performed on different content. For example, if the third party system 130 is an online merchant, the third party system includes tracking mechanisms in content presenting products for purchase by users that communicate information when the user selects a product for purchase or stores a product in association with the user and includes another tracking mechanism in content allowing the user to search the third party system 130 that communicates information when the user searches the third party system 130. As another example, the third party system 130 includes different tracking mechanisms in various web pages provided by the third party system 130, so a tracking mechanism included in a web page executes instructions when an interaction with the web page matching an interaction specified by the tracking mechanism is received; hence, the third party system 130 may include tracking mechanisms specifying different interactions in various web pages. Alternatively, the third party system 130 include a common tracking mechanism in various content provided by the third party system 130, allowing an interaction performed on various content provided by the third party system 140 to be identified by the common tracking mechanism.

When the client device 110 receives 315 an interaction with the content provided by the third party system 130 that matches an interaction specified by the tracking mechanism, the client device 110 executes instructions in the tracking mechanism that transmit 320 information describing the interaction with the content provided by the third party system 130 to the online system 140. Information communicated to the online system 140 identifies the interaction and identifies content provided by the third party system 130 involved in the interaction. For example, if the received interaction included a product provided by the third party system 130 in an online shopping cart or in a list associated with the user by the third party system 130, the information describing the interaction includes an identifier of the product used by the third party system 130. As another example, if the received interaction involved a content item provided by the third party system 130 (e.g., saving an image, sharing an article with another user), the information transmitted 320 to the online system 140 includes an identifier of the content item used by the third party system 130. Various methods may be used to transmit 320 the information describing the interaction with the content provided by the third party system 130 to the inline system. For example, after receiving 315 the interaction matching an interaction specified by the tracking mechanism, the client device 110 executes instructions in the tracking mechanism that creates a frame in the content provided by the third party system 130, where the created frame is associated with the online system 140 (e.g., the frame is in a domain of the online system 140). As another example, after receiving 315 the interaction matching the interaction specified by the tracking mechanism, the client device 110 executes instruction in the tracking mechanism that execute an application programming interface call (e.g., an application programming interface call provided in instructions from the online system 140 and included in the content provided by the third party system 130) that communicates information to the online system 140 from the client device 110; hence, the third party system 130 may include an application programming interface call in an application provided by the third party system 130 that communicates information describing one or more interactions identified by the application programming interface call to the online system 140. Information describing the received interaction with the content provided by the third party system 130 is transmitted 320 to the online system 140 via the frame. Additionally, the online system 140 retrieves information identifying the user who performed the interaction described by the information transmitted 320 by the tracking mechanism.

To prevent the third party system 130 from receiving information identifying the user who performed the interaction, the online system 140 retrieves user identifying information associated with the user by the online system 140 and stores 325 the information describing the interaction in association with the user identifying information. For example, the online system 140 retrieves user identifying information stored on the client device 110 by the online system 140. For example, the online system 140 retrieves a cookie previously communicated by the online system 140 to an application (e.g. a browser) executing on the client device 110 and stored on the client device 110 when the online system 140 receives the information transmitted 320 by the tracking mechanism. As another example, the tracking mechanism obtains user identifying information from an application executing on the client device 110 and associated with the online system 140 and communicates the user identifying information to the online system 140 along with information describing the interaction. For example, the tracking mechanism retrieves obfuscated (e.g., a hashed) user identifying information associated with the user by the online system 140 and stored on the client device 110 and transmits 320 the obfuscated user identifying information to the online system 140 along with the information describing the received interaction with the content provided by the third party system 130; the online system 140 retrieves the user identifying information form the obfuscated user identifying information. The online system 140 stores 325 the information describing the interaction in association with the retrieved user identifying information to maintain a record of interactions by the user with content provided by the third party system 130. For example, the online system 140 identifies a user profile associated with the user identifying information and stores 325 the information describing the interaction with the content provided by the third party system 130 from the tracking mechanism in association with the user profile. Hence, as various users perform interactions with content provided by the third party system 130 matching interactions specified by one or more tracking mechanisms included in the content provided by the third party system 130, the online system 140 stores 325 information associated with the users identifying their interactions with content provided by the third party system 130, allowing storage of interactions between the users and the content provided by the third party system 130 without providing information identifying the users, or information describing characteristics of the users, to the third party system 130. For example, the third party system 130 is unable to retrieve information maintained by the online system 140 in association with the users who performed the interactions, while the online system 140 maintains a record of the interactions by online system users with content provided by the third party system 130.

Information stored 325 by the online system 140 describing interactions by the user with content provided by the third party system 130 may be used by the third party system 130 to identify content for presentation to the user. For example, the third party system 130 provides 330 a content item to the online system 140 including targeting criteria specifying an interaction with content provided by the third party system 130. As a specific example, the third party system 130 provides 330 an advertisement request ("ad request") to the online system 140 including content for presentation to online system users and including targeting criteria specifying one or more interactions with content provided by the third party system 130 or specifying an interaction with specific content provided by the third party system 130. Based on the stored information identifying interactions by users with content provided by the third party system 130, the online system 140 identifies users associated with one or more interactions with content provided by the third party system 130 matching the interaction, or interactions, specified by the targeting criteria. For example, if a content item provided 330 to the online system 140 by the third party system 130 includes targeting criteria specifying an interaction that includes a product in a list of products maintained by the third party system 130, the online system 140 identifies 335 users associated with information indicating the users included the product in a list of products associated with the user by the third party system 130. As another example, if a content item provided 330 to the online system 140 by the third party system 130 includes targeting criteria identifying a specific interaction with particular content provided by the third party system 130, the online system 140 identifies 335 users associated with information stored by the online system 140 indicating the users performed the specific interaction with the particular content provided by the third party system 130.

The online system 140 includes 340 the content item from the third party system 130 in selection processes performed by the online system 140 for various identified users. Hence, the online system 140 determines the identified users are eligible to be presented with the content item provided 330 by the third party system 130. As described above in conjunction with FIG. 2, a selection process selects content items for presentation to a user based at least in part on measures of relevance between various content items and the user. For content items that are ad requests, a selection process uses bid amounts associated with the ad requests when selecting content items for presentation to a user. In some embodiments, the selection process ranks ad requests eligible for presentation to a user based at least in part on their bid amounts and selects ad requests having at least a threshold position in the ranking for presentation to the user. Content items, including ad requests, selected by a selection process for a user are communicated from the online system 140 to a client device 110 associated with the user for presentation.

In some embodiments, the online system 140 may analyze information stored by the online system 140 describing user interactions with content provided by the third party system 130 and provide information to the third party system 130 describing user interactions with content provided by the third party system 130, allowing the third party system to analyze interactions with various content. For example, the online system 140 identifies different interactions by users with specific content provided by the third party system 130 (e.g., different interactions with a particular web page, a number of various different interactions with a particular web page during a certain time interval). The third party system 130 may provide information identifying the specific content to the online system 140 in some embodiments, or the online system 140 may identify interactions with each content item provided by the third party system 130 with which at least one online system user interacted. In some embodiments, the online system 140 accounts for characteristics of users when analyzing the information describing user interaction with content provided by the third party system 130. For example, the online system 140 identifies interactions with content provided by the third party system 130 performed by users having specific characteristics or combinations of characteristics (e.g., users in a specified location, users within a specified age range, etc.). The third party system 130 may identify characteristics or combination of characteristics to the online system 140, which identifies interactions with content provided by the third party system 130 by online system users having at least a threshold number of the characteristics or combination of characteristics provided by the third party system 130. As another example, the online system 140 identifies a number or a frequency of occurrence of a specific interaction with content provided by the third party system 130 from the stored information describing user interactions with content provided by the third party system 130. In some embodiments, the third party system 130 provides the online system 140 with criteria specifying one or more of: interactions, content provided by the third party system 130, and characteristics of the user and the online system 140 identifies interactions by online system users with content satisfying at least a threshold number of the criteria and communicates information describing the identified interactions to the third party system 130, allowing the online system 140 to provide the third party system 130 with analytical information describing user interactions with content provided by the third party system 130 without providing information identifying online system users to the third party system 130. Hence, the online system 140 may provide the third party system 130 with analytical information describing interactions by users having certain characteristics with content provided by the third party system 130, describing certain interactions by users with content provided by the third party system 130, describing interactions by users with certain content provided by the third party system 130, or any other suitable information describing stored user interactions with content provided by the third party system 130, which the third party system 130 may use to subsequently modify content provided by the third party system 130. However, information describing stored interactions with content provided by the third party system 130 that is communicated to the third party system 130 does not include information allowing the third party system 130 to identify particular users of the online system 140, maintaining the privacy of the online system users.

Figure 4:
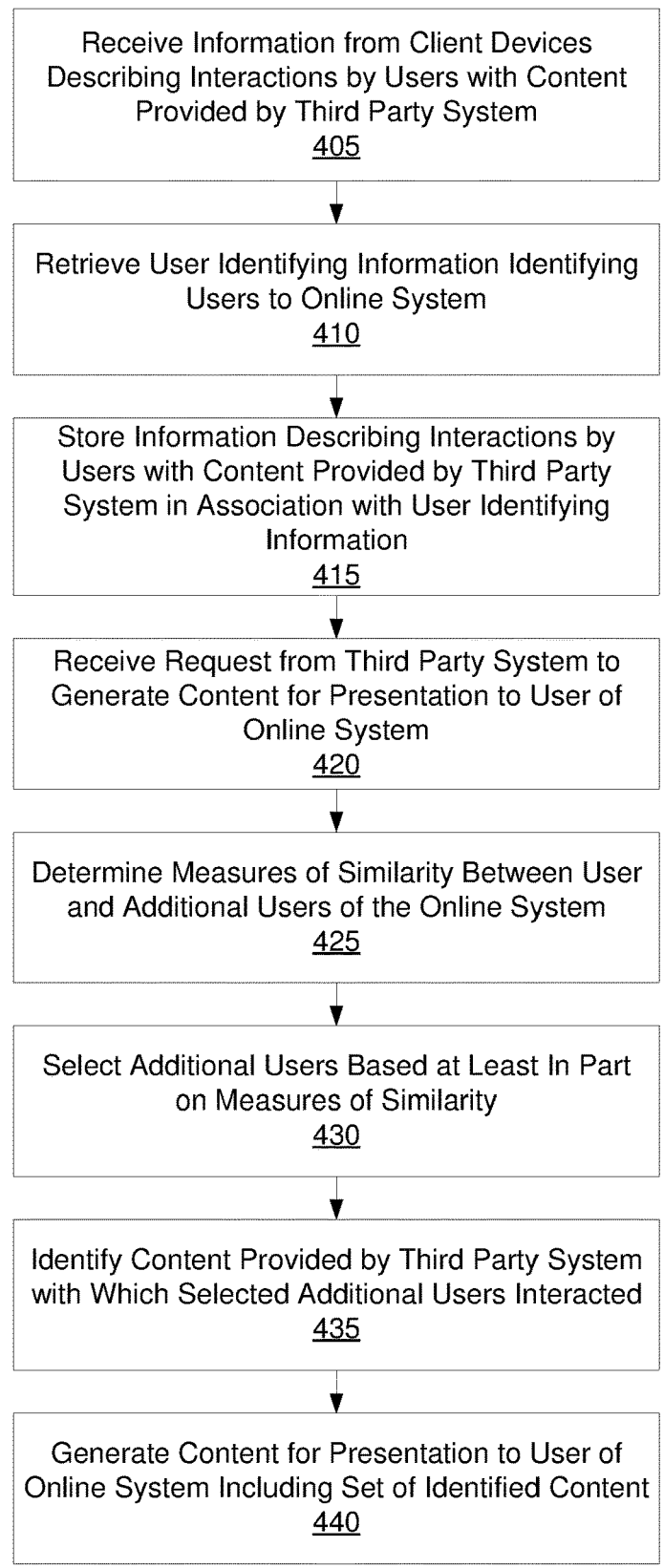
FIG. 4 is a flowchart of a method for generating content for presentation to an online system user based on interactions by additional users with content provided by a third party system, in accordance with an embodiment.

Generating Content for Presentation to an Online System User Based on Interactions with Third Party System Content by Online System Users FIG. 4 is a flowchart of a method for generating content for presentation to an online system user based on interactions by additional online system users with content provided by a third party system 130. In other embodiments, the method may include different and/or additional steps than those shown in FIG. 4. Additionally, steps of the method may be performed in different orders than the order described in conjunction with FIG. 4 in various embodiments.

The online system 140 receives 405 information from client devices 110 describing interactions by online system users with content provided by a third party system 130. As described above in conjunction with FIGS. 2 and 3, the third party system 130 includes a tracking mechanism in content provided by the third party system 130 that specifies one or more interactions and includes instructions that, when executed by a client device 110, communicate information describing a received interaction with the content provided by the third party system 130 matching an interaction specified by the tracking mechanism. For example, when a client device 110 presenting the content from the third party system 130 receives an interaction with the content form the third party system 130 matching an interaction specified by a tracking mechanism included in the content, the client device 110 executes the instructions included in the tracking mechanism. In one embodiment, executing the instructions included in the tracking mechanism generates a frame associated with the online system 140 within the content from the third party system 130. The online system 140 receives 405 information describing the interaction with the content provided by the third party 130 from the frame associated with the online system 140.

Additionally, the online system 140 retrieves 410 user identifying information associated with online system users who performed the interactions with the content provided by the third party system 130 described by the received information. For example, the online system 140 retrieves 410 user identifying information stored on the client device 110 by the online system 140 via a frame associated with the online system 140 and generated within content provided by the third party system 130. In various embodiments, the online system 140 retrieves 410 a cookie previously communicated by the online system 140 to an application (e.g. a browser, an application associated with the online system 140) executing on the client device 110 and stored on the client device 110 when the online system 140 receives 405 information describing an interaction received by the client device 110 matching an interaction specified in a tracking mechanism included in content provided by the third party system 130 to the client device 110. The cookie may be retrieved 410 by the online system 140 via a frame generated in the content provided by the third party system 130 and associated with the online system 140.

The online system 140 stores 415 the information describing the information describing the interaction in association with the retrieved user identifying information to maintain a record of interactions by the user with content provided by the third party system 130. For example, the online system 140 identifies a user profile associated with the user identifying information retrieved 410 for a user and stores 415 received information describing interaction by the user with content provided by the third party system 130 from the tracking mechanism in association with the identified user profile. Hence, as various users perform interactions with content provided by the third party system 130 matching interactions specified by one or more tracking mechanisms included in content provided by the third party system 130, the online system 140 stores 415 information associated with the users identifying their interactions with content provided by the third party system 130. By storing information describing users' interactions with content provided by the third party system 130, the online system 140 allows the third party system 130 to account for users' previous interactions with content provided by the third party system 130 without the third party system 130 itself having access to information describing the users or the users' prior interactions with content provided by the third party system 130.

To allow the third party system 130 to account for users' interactions with content provided by the third party system 130 when providing content to a user of the online system 140, the online system 140 receives 420 a request from the third party system 130 to generate content for presentation to the user. For example, the online system 140 receives 420 a request from the third party system 130 to generate a page of content to a user of the online system 140. The request includes information identifying the user of the online system 140, such as a username associated with the user by the online system 140, an e-mail address associated with the user, a username associated with the user by the third party system 130, or any other suitable information for the online system to identify the user. Based on the information identifying the user in the received request, the online system 140 retrieves information associated with the user and stored by the online system 140. In various embodiments, the online system 140 compares information identifying the user included in the request to information associated with online system users and identifies the user associated with information matching the information identifying the user included in the request.

Based on the information stored by the online system 140 and associated with the user, the online system 140 determines 425 measures of similarity between the user and additional users of the online system 140. For example, the measure of similarity between the user and an additional user is determined 425 as a cosine similarity between demographic information associated with the user and demographic information associated with the additional user. In some embodiments, the online system 140 determines a cosine similarity between a set of demographic information associated with the user and with the additional user specified by the third party system 130 to determine 425 the measure of similarity between the user and the additional user. The third party system 130 may specify the set of demographic information in the request to the online system 140 identifying the user. Alternatively, the third party system 130 separately identifies the set of demographic information to the online system 140. The online system 140 may determine 425 measures of similarity between the user and a set of additional users of the online system 140, such as a set of additional users satisfying one or more criteria. For example, the online system 140 determines a set of additional users who have performed one or more interactions with content provided by the third party system 130 within a threshold time interval matching a content item provided by the third party system 130 with which the user interacted (e.g., additional users who have interacted with at least one content item provided by the third party system 130 within a threshold time interval of the user interacting with the content item provided by the third party system 130) or determines a set of additional users associated with specific demographic information. In various embodiments, any suitable method may be used to determine 425 measures of similarity between the user and the additional users of the online system 140.

The online system 140 selects 430 one or more additional users based at least in part on the determined measures of similarity. For example, the online system 140 selects 430 additional users with whom the user has at least a threshold measure of similarity. As another example, the online system 140 ranks additional users based on their measures of similarity to the user and selects 430 additional users having at least a threshold position in the ranking. In some embodiments, the online system 140 accounts for characteristics of the additional users when selecting 430 additional users. For example, the online system 140 modifies the measures of similarity between the user and an additional user based on a frequency with which the additional user interacts with content provided by the third party system, based on a connection between the user and the additional user, based on a number of actions associated with the user and the additional user, based on a number of interactions between the user and the additional user, or based on any other suitable information; based on the modified measures of similarity, the online system 140 selects 430 one or more additional users.

Content provided by the third party system 130 with which the selected additional users interacted is identified 435 by the online system 140 from information stored by the online system 140 that describes interactions by the selected additional users with content provided by the third party system 130. For example, the online system 140 retrieves stored information describing interactions by the selected additional users with content provided by the third party system 130 and identifies 435 content provided by the third party system with which at least a threshold number or a threshold percentage of the selected additional users interacted. Alternatively, the online system ranks 140 the selected additional users based on their measures of similarity to the user and identifies 435 content item identifiers or product identifiers of content presented by the third party system 130 with which selected additional users having at least a threshold position in the ranking interacted. In other embodiments, the online system 140 identifies 435 content provided by the third party system 130 associated with at least a threshold number of interactions by the selected additional users. Characteristics of content presented by the third party system 130 with which selected additional users interacted may also be used by the online system 140 when identifying 435 content provided by the third party system 130 with which the selected additional users interacted. For example, the online system 140 identifies 435 content provided by the third party system 130 with which one or more selected additional users interacted that is a specific type of content (e.g., a product, a product description, an image, an article, etc.), content provided by the third party system 130 with which one or more selected additional users interacted within a time interval (e.g., within one week of a current time), content provided by the third party system 130 with which one or more selected additional users performed one or more specific interactions, or any other suitable information. The third party system 130 may specify characteristics used to identify 435 content presented by the third party system 130 to selected additional users or separately specify characteristics to the online system 140 for identifying 435 content presented by the third party system 130 to selected additional users.

In some embodiments, the online system 140 retrieves prior interactions between the user and additional content provided by the third party system 130. For example, the online system 140 identifies content items or products provided by the third party system 130 with which the user interacted within a threshold amount of a current time. As another example, the online system 140 identifies content items or products provided by the third party system 130 with which the user performed at least a threshold number of interactions within a time interval or with which the user has at least a threshold frequency of interaction. In another embodiment, the online system 140 identifies content items or products with which the user previously interacted that have at least a threshold measure of similarity to the content item or product with which the user most recently interacted. Measures of similarity between products or content items may be determined based on the characteristics of the products or content items in a similar manner as the measures of similarity between the user and additional users further described above. Additionally, the online system 140 may identify content items or products provided by the third party system 130 with which the user performed a specific interaction (or interactions) or content items or products having one or more specific characteristics. The specific interactions or characteristics may be identified to the online system 140 by the third party system 130 in some embodiments.

Based on the identified content provided by the third party system 130 with which the selected additional users interacted or with which the user previously interacted, the online system 140 generates 440 content for presentation to the user. In various embodiments, the online system 140 generates a page of content including a set of the identified content. The generated page includes a set of the identified content and instructions for presenting the set of the identified content. For example, the page includes identified content items or products presented to the selected additional users by the third party system 130 with which the selected additional users interacted. As another example, the page includes identified content items or products presented to the user by the third party system 130 with which the user previously interacted. Additionally, the page may include a combination of identified content items or products with which the selected additional users interacted and with which the user previously interacted. The online system 140 may group the set of identified content items or products with which the selected additional users interacted based on the types of interactions by the selected additional users with the identified content items or products. For example, the page generated 440 by the online system 140 includes a group of identified products that the selected additional users included in an online shopping cart and another group of identified products that the selected additional users included in lists associated with the selected additional users by the third party system 130. Alternatively, the online system 140 communicates the identified content provided by the third party system 130, and the third party system 130 generates content for presentation to the user based at least in part on the identified content. For example, the online system 140 communicates content identifiers or product identifiers used by the third party system 130 corresponding content items or products included in the identified content provided by the third party system 130 with which the user or the selected additional users interacted. The online system 140 may also identify interactions performed by the user or by the selected additional users with the identified content, which the third party system 130 may use to generate content for presentation to the user based at least in part on the identified content.

In some embodiments, the online system 140 presents content in the set of content in an order based at least in part on characteristics of content items or products in the set of identified content and/or characteristics of the selected additional users. For example, content items from the identified content are ordered based on a number of interactions with each content item so content items associated with a greater number of interactions have higher positions in the order. As another example, the online system 140 orders content in the set of content based on affinity scores between the user and additional users who interacted with various content items in the set of content items; affinity scores between the user and additional users who interacted with each identified content item may be determined by the online system 140, which orders content items in the set of content items so content items with which additional users for whom the user has higher affinity scores have higher positions in the order. In other embodiments, the online system 140 visually distinguishes content items (including products) in the set of content from the identified content having certain characteristics. For example, identified content items with which selected additional users having greater than a threshold measure of similarity to the user are visually distinguished from other identified content items. In some embodiments, identified content items with which selected additional users having greater than the threshold measure of similarity to the user are more prominently presented in the generated content than other identified content items, are presented in a different size or color than other identified content items, or are otherwise visually distinguished from other identified content items. As another example, identified content items or products with which at least a threshold number of selected additional users interacted or performed a specific type of interaction are visually distinguished from other content in the generated content.

The online system 140 communicates the generated content to the third party system 130 for presentation to the user in some embodiments. Alternatively, the online system 140 communicates the generated content to a client device 110 associated with the user for presentation. Hence, the online system 140 maintaining information describing user interactions with content provided by the third party system 130 allows the third party system 130 to leverage prior user interactions with content provided by the third party system 130 to produce content for presentation to an online system user, while the online system 140 generates the content for presentation to the online system user on behalf of the third party system 130, which prevents the third party system 130 from accessing or obtaining information associated with various online system users by the online system 140, preserving privacy of the online system users.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
    receiving a request from a third party system to generate content for presentation to a target user of an online system external to the third party system;
    responsive to receiving, via a tracking mechanism included by the third party system in content, information describing an interaction performed by an additional user of the online system with the content, retrieving user identifying information stored on a client device of the additional user, wherein the user identifying information is not provided to the third party system;
    determining a measure of similarity between the target user of the online system and the additional user of the online system based on activity of the target user and the additional user within the online system; and
    providing the content with which the additional user interacted to the target user of the online system responsive to the measure of similarity exceeding a threshold.

2. The method of claim 1, wherein determining the measure of similarity between the target user of the online system and the additional user of the online system comprises:
    determining a cosine similarity between characteristics of the target user and characteristics of the additional user of the online system.

3. The method of claim 1, wherein determining the measure of similarity between the target user of the online system and the additional user of the online system comprises:
    determining the measure of similarity between the target user of the online system and the additional user of the online system based at least in part on a set of characteristics common to both the target user of the online system and the additional user of the online system.

4. The method of claim 1, wherein the measure of similarity is based at least in part on characteristics of the target user of the online system and characteristics of the additional user of the online system such that the characteristics of the target user are not provided to the third party system.

5. The method of claim 4, wherein characteristics of the target user of the online system and the characteristics of the additional user of the online system are specified by the third party system.

6. The method of claim 4, wherein a characteristic is selected from a group consisting of: a type of content, an interaction with the content provided by the third party system within a time interval, a specific interaction with the content provided by the third party system, and any combination thereof.

7. The method of claim 1, wherein the content was interacted with by at least a threshold number of one or more selected additional users.

8. The method of claim 1, wherein content was interacted with by at least a threshold percentage of one or more selected additional users.

9. The method of claim 1, wherein the user was ranked highest among one or more selected additional users based on measures of similarity.

10. The method of claim 1, wherein the content is associated with at least a threshold number of interactions by the one or more selected additional user.

11. The method of claim 1, wherein the content has one or more specified characteristics with which the additional user interacted.

12. The method of claim 1, further comprising:
    generating a page including the content provided by the third party system.

13. The method of claim 1, further comprising:
    communicating the content to a client device associated with the target user for presentation.

14. The method of claim 1, further comprising:
    communicating the content to the third party system for presentation to the target user.

15. A computer program product comprising a non-transitory computer readable storage medium having instructions encoded thereon that, when executed by a processor, cause the processor to:
    receive a request from a third party system to generate content for presentation to a target user of an online system external to the third party system;
    responsive to receiving, via a tracking mechanism included by the third party system in content, information describing an interaction performed by an additional user of the online system with the content, retrieve user identifying information stored on a client device of the additional user, wherein the user identifying information is not provided to the third party system;
    determine a measure of similarity between the target user of the online system and the additional user of the online system based on activity of the target user and the additional user within the online system; and
    provide the content with which additional user interacted to the target user of the online system responsive to the measure of similarity exceeding a threshold.

16. The computer program product of claim 15, wherein determining the measure of similarity between the target user of the online system and the additional user of the online system comprises:
    determining a cosine similarity between characteristics of the target user and characteristics of the additional user of the online system.

17. The computer program product of claim 15, wherein at least a threshold number of one or more selected additional users have interacted with the content.

18. The computer program product of claim 15, wherein at least a threshold percentage of the one or more selected additional users have interacted with the content.

19. The computer program product of claim 15, further comprising:
    generating a page including the content provided by the third party system with which the additional user interacted.

* * * * *

UNITED STATES PATENT AND TRADEMARK OFFICE
CERTIFICATE OF CORRECTION

Page 1 of 1

PATENT NO. : 10,956,525 B1
APPLICATION NO. : 16/291274
DATED : March 23, 2021
INVENTOR(S) : Tirunelveli R. Vishwanath et al.

It is certified that error appears in the above-identified patent and that said Letters Patent is hereby corrected as shown below:

In the Claims

In Column 28, Claim 10, Line 12, delete "the one or more selected additional user" and insert -- one or more selected additional users --, therefor.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*